United States Patent
Huke et al.

(10) Patent No.: US 12,211,352 B2
(45) Date of Patent: *Jan. 28, 2025

(54) INCREMENTAL WAGER METHOD

(71) Applicant: AdrenalineIP, Washington, DC (US)

(72) Inventors: Casey Alexander Huke, Washington, DC (US); John Cronin, Jericho, VT (US); Joseph W. Beyers, Saratoga, CA (US); Michael D'Andrea, Burlington, VT (US); Michael Baker, Georgie, VT (US)

(73) Assignee: ADRENALINEIP, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/542,754

(22) Filed: Dec. 6, 2021

(65) Prior Publication Data

US 2022/0130214 A1    Apr. 28, 2022

Related U.S. Application Data

(63) Continuation of application No. 16/950,049, filed on Nov. 17, 2020, now Pat. No. 11,195,379.

(60) Provisional application No. 63/106,029, filed on Oct. 27, 2020.

(51) Int. Cl.
*G07F 17/32* (2006.01)
*G06F 16/2457* (2019.01)
*G06Q 50/34* (2012.01)

(52) U.S. Cl.
CPC ...... *G07F 17/3288* (2013.01); *G06F 16/2457* (2019.01); *G06Q 50/34* (2013.01); *G07F 17/3244* (2013.01)

(58) Field of Classification Search
CPC . G07F 17/3288; G07F 17/3244; G06Q 50/34; G06F 16/2457
See application file for complete search history.

(56) References Cited

U.S. PATENT DOCUMENTS

| | | | |
|---|---|---|---|
| 8,360,863 B2 | 1/2013 | Friedman | |
| 8,636,575 B2 | 1/2014 | Lutnick et al. | |
| 10,198,903 B2 | 2/2019 | Amaitis et al. | |
| 2003/0139214 A1* | 7/2003 | Wolf | G07F 17/3227 463/42 |
| 2004/0185933 A1* | 9/2004 | Nicely | G07F 17/3262 463/25 |
| 2006/0046807 A1* | 3/2006 | Sanchez | A63F 13/86 463/9 |

(Continued)

OTHER PUBLICATIONS

Notification of Transmittal of the International Search Report and the Written Opinion of the International Searching Authority issued on Dec. 1, 2021, in connection with corresponding international Application No. PCT/US2021/056571 (8pp.).

*Primary Examiner* — Steve Rowland
(74) *Attorney, Agent, or Firm* — Maier & Maier, PLLC

(57) ABSTRACT

A method of encouraging a user to increase their wager on a play by play wagering platform by determining the likelihood the user will increase their wager based upon their wager history and proposing an increase amount based upon their likelihood of increasing their wager such that a higher likelihood of increase results in a higher proposed increase amount and a lower likelihood results in a lower proposed increase amount.

8 Claims, 2 Drawing Sheets

| User | Event | Play # | Wager | Odds | Outcome | Result |
|---|---|---|---|---|---|---|
| 3151 | 321 | 11 | $75.00 | 2/1 | Turnover | Win |
| 3151 | 321 | 18 | $125.00 | 4/1 | First down | Loss |
| 3151 | 365 | 3 | $50.00 | 2/1 | Turnover | Win |
| 3151 | 365 | 7 | $100.00 | 2/1 | First down | Win |
| 3151 | 365 | 13 | $200.00 | 2/1 | First down | Loss |
| 3151 | 501 | 2 | $50.00 | 4/1 | First down | Loss |
| 3151 | 501 | 5 | $25.00 | 2/1 | Score | Win |
| 3151 | 501 | 8 | $100.00 | 2/1 | First down | Win |
| 3151 | 501 | 14 | $50.00 | 2/1 | Turnover | Win |

Historical Wager Database Data Content

(56) References Cited

U.S. PATENT DOCUMENTS

| | | | | |
|---|---|---|---|---|
| 2007/0087804 A1* | 4/2007 | Knowles | ............ | G07F 17/3288 |
| | | | | 463/43 |
| 2009/0239650 A1* | 9/2009 | Alderucci | ........... | G07F 17/3227 |
| | | | | 463/25 |
| 2012/0129610 A1* | 5/2012 | Mazursky | ............... | A63F 13/65 |
| | | | | 463/42 |
| 2012/0289323 A1* | 11/2012 | Whitmire | ............ | G07F 17/3276 |
| | | | | 463/26 |
| 2013/0060362 A1* | 3/2013 | Murphy | ............. | A63F 13/2145 |
| | | | | 700/93 |
| 2013/0079128 A1* | 3/2013 | Thomas | .................. | A63F 13/79 |
| | | | | 463/30 |
| 2019/0221080 A1* | 7/2019 | Reetz | .................. | G07F 17/3223 |
| 2019/0262721 A1* | 8/2019 | MacInnes | ........... | G07F 17/3276 |
| 2020/0020203 A1* | 1/2020 | Jordan | ................ | G07F 17/3258 |
| 2020/0098228 A1 | 3/2020 | Amaitis et al. | | |
| 2020/0265684 A1* | 8/2020 | Hufnagl-Abraham | ...................... | |
| | | | | G07F 17/3267 |
| 2020/0327780 A1* | 10/2020 | Higgins | ............. | G07F 17/3288 |
| 2020/0357246 A1* | 11/2020 | Nelson | .................. | G07F 17/323 |

* cited by examiner

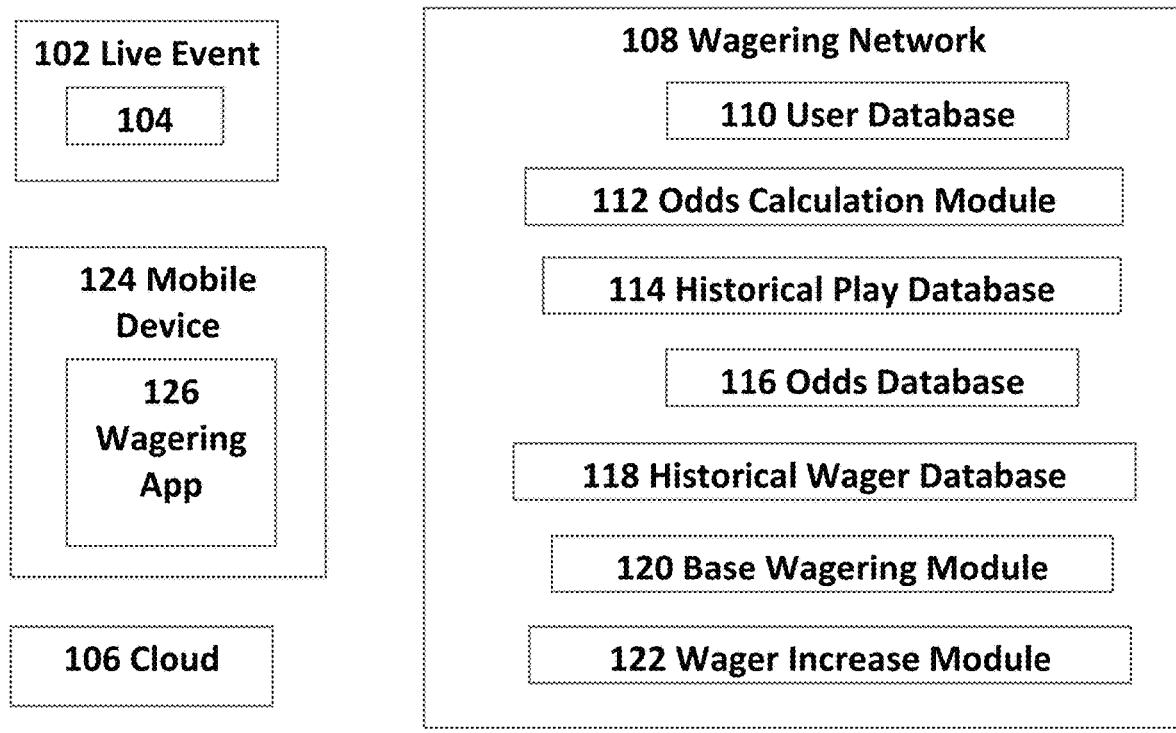
Fig.1 Content - High Level Diagram
| User | Event | Play # | Wager | Odds | Outcome | Result |
|---|---|---|---|---|---|---|
| 3151 | 321 | 11 | $75.00 | 2/1 | Turnover | Win |
| 3151 | 321 | 18 | $125.00 | 4/1 | First down | Loss |
| 3151 | 365 | 3 | $50.00 | 2/1 | Turnover | Win |
| 3151 | 365 | 7 | $100.00 | 2/1 | First down | Win |
| 3151 | 365 | 13 | $200.00 | 2/1 | First down | Loss |
| 3151 | 501 | 2 | $50.00 | 4/1 | First down | Loss |
| 3151 | 501 | 5 | $25.00 | 2/1 | Score | Win |
| 3151 | 501 | 8 | $100.00 | 2/1 | First down | Win |
| 3151 | 501 | 14 | $50.00 | 2/1 | Turnover | Win |
Fig.2 Historical Wager Database Data Content

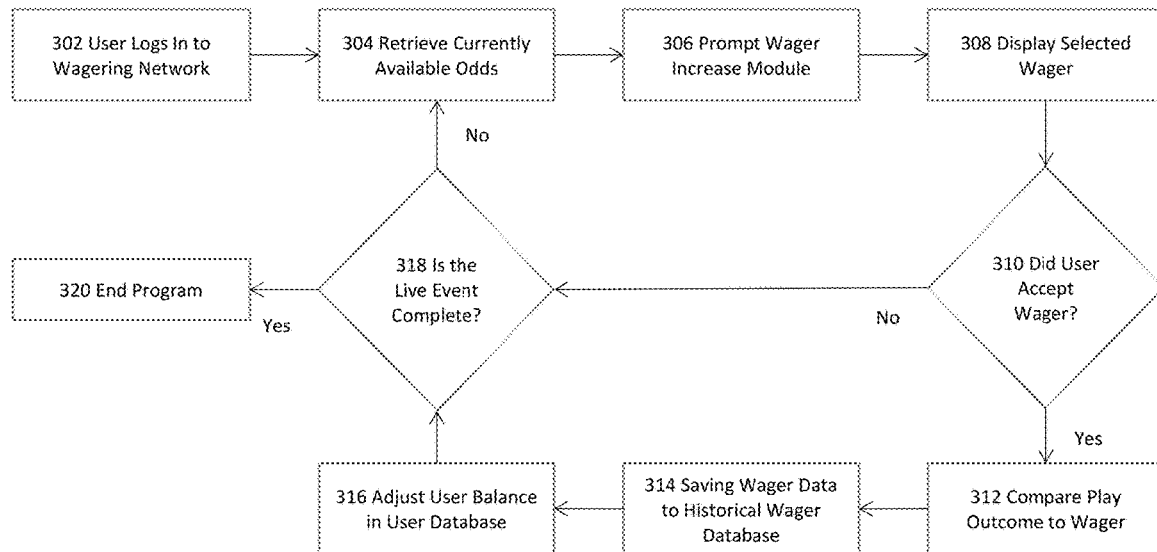
Fig.3 Base Wagering Module Object Content
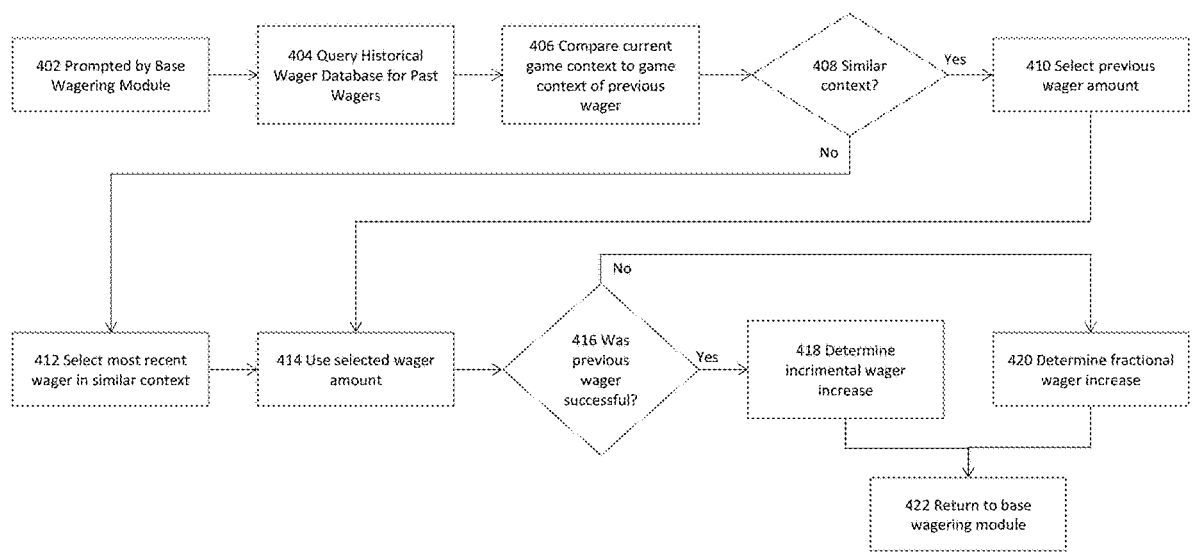
Fig.4 Wager Increase Module Object Content

INCREMENTAL WAGER METHOD

CROSS-REFERENCE TO RELATED APPLICATIONS

The present patent application claims benefit and priority to U.S. Non-Provisional patent application Ser. No. 16/950,049 entitled "INCREMENTAL WAGER METHOD" filed Nov. 17, 2020 which claims benefit and priority to U.S. Provisional Patent Application No. 63/106,029 entitled "INCREMENTAL WAGER METHOD" filed on Oct. 27, 2020 which is hereby incorporated by reference into the present disclosure.

FIELD

The embodiments are generally related to wagering on live sporting events, specifically increasing wager amounts while play by play wagering.

BACKGROUND

Play by play wagering platform operators typically profit either via a fee per wager or by taking a percentage of all wagers made. In the case of a percentage cut, it is in the interest of the operators to encourage users to place the maximum wager they are willing to place.

When placing wagers on a play by play wagering platform, it can be difficult to change a wager once placed before the betting period closes. The short wagering window is due to the rapid pace of most sporting events, usually leaving at most a couple minutes to place a bet and reconsider. As such, a method of quickly adjusting a wager prior to the close of a betting period is needed.

Some sporting events have less time to place a wager than others when placing wagers on a play by play wagering platform. For example, a baseball game may allow a couple minutes or longer if there is a pitcher or side change, however in an American football game, the play clock allows only 40 seconds. Furthermore, teams are not required to use the entirety of the time on the play clock resulting in time between plays less than the allowed 40 seconds. For this reason, allowing a user to quickly place a wager may increase the quantity and amount of wagers placed.

BRIEF DESCRIPTIONS OF THE DRAWINGS

The accompanying drawings illustrate various embodiments of systems, methods, and various other aspects of the embodiments. Any person with ordinary skills in the art will appreciate that the illustrated element boundaries (e.g. boxes, groups of boxes, or other shapes) in the figures represent an example of the boundaries. It may be understood that, in some examples, one element may be designed as multiple elements or that multiple elements may be designed as one element. In some examples, an element shown as an internal component of one element may be implemented as an external component in another, and vice versa. Furthermore, elements may not be drawn to scale. Non-limiting and non-exhaustive descriptions are described with reference to the following drawings. The components in the figures are not necessarily to scale, emphasis instead being placed upon illustrating principles.

FIG. 1 illustrates an incremental wager method, according to an embodiment.

FIG. 2 illustrates a historical wager database, according to an embodiment.

FIG. 3 illustrates a base wagering module, according to an embodiment.

FIG. 4 illustrates a wager increase module, according to an embodiment.

DETAILED DESCRIPTION

Aspects of the present invention are disclosed in the following description and related figures directed to specific embodiments of the invention. Those of ordinary skill in the art will recognize that alternate embodiments may be devised without departing from the spirit or the scope of the claims. Additionally, well-known elements of exemplary embodiments of the invention will not be described in detail or will be omitted so as not to obscure the relevant details of the invention As used herein, the word exemplary means serving as an example, instance or illustration. The embodiments described herein are not limiting, but rather are exemplary only. It should be understood that the described embodiments are not necessarily to be construed as preferred or advantageous over other embodiments. Moreover, the terms embodiments of the invention, embodiments or invention do not require that all embodiments of the invention include the discussed feature, advantage, or mode of operation.

Further, many of the embodiments described herein are described in terms of sequences of actions to be performed by, for example, elements of a computing device. It should be recognized by those skilled in the art that the various sequence of actions described herein can be performed by specific circuits (e.g., application specific integrated circuits (ASICs)) and/or by program instructions executed by at least one processor. Additionally, the sequence of actions described herein can be embodied entirely within any form of computer-readable storage medium such that execution of the sequence of actions enables the processor to perform the functionality described herein. Thus, the various aspects of the present invention may be embodied in a number of different forms, all of which have been contemplated to be within the scope of the claimed subject matter. In addition, for each of the embodiments described herein, the corresponding form of any such embodiments may be described herein as, for example, a computer configured to perform the described action.

With respect to the embodiments, a summary of terminology used herein is provided.

An action refers to a specific play or specific movement in a sporting event. For example, an action may determine which players were involved during a sporting event. In some embodiments, an action may be a throw, shot, pass, swing, kick, hit, performed by a participant in a sporting event. In some embodiments, an action may be a strategic decision made by a participant in the sporting event such as a player, coach, management, etc. In some embodiments, an action may be a penalty, foul, or type of infraction occurring in a sporting event. In some embodiments, an action may include the participants of the sporting event. In some embodiments, an action may include beginning events of sporting event, for example opening tips, coin flips, opening pitch, national anthem singers, etc. In some embodiments, a sporting event may be football, hockey, basketball, baseball, golf, tennis, soccer, cricket, rugby, MMA, boxing, swimming, skiing, snowboarding, horse racing, car racing, boat racing, cycling, wrestling, Olympic sport, eSports, etc. Actions can be integrated into the embodiments in a variety of manners.

A "bet" or "wager" is to risk something, usually a sum of money, against someone else's or an entity on the basis of the outcome of a future event, such as the results of a game or event. It may be understood that non-monetary items may be the subject of a "bet" or "wager" as well, such as points or anything else that can be quantified for a "wager" or "bet." A user refers to a person who bets or wagers. A user may also be referred to as a user, client, or participant throughout the present invention. A "bet" or "wager" could be made for obtaining or risking a coupon or some enhancements to the sporting event, such as better seats, VIP treatment, etc. A "bet" or "wager" can be done for certain amount or for a future time. A "bet" or "wager" can be done for being able to answer a question correctly. A "bet" or "wager" can be done within a certain period of time. A "bet" or "wager" can be integrated into the embodiments in a variety of manners.

A "book" or "sportsbook" refers to a physical establishment that accepts bets on the outcome of sporting events. A "book" or "sportsbook" system enables a human working with a computer to interact, according to set of both implicit and explicit rules, in an electronically powered domain for the purpose of placing bets on the outcome of sporting event. An added game refers to an event not part of the typical menu of wagering offerings, often posted as an accommodation to patrons. A "book" or "sportsbook" can be integrated into the embodiments in a variety of manners.

To "buy points" means a player pays an additional price (more money) to receive a half-point or more in the player's favor on a point spread game. Buying points means you can move a point spread, for example up to two points in your favor. "Buy points" can be integrated into the embodiments in a variety of manners.

The "price" refers to the odds or point spread of an event. To "take the price" means betting the underdog and receiving its advantage in the point spread. "Price" can be integrated into the embodiments in a variety of manners.

"No action" means a wager in which no money is lost or won, and the original bet amount is refunded. "No action" can be integrated into the embodiments in a variety of manners.

The "sides" are the two teams or individuals participating in an event: the underdog and the favorite. The term "favorite" refers to the team considered most likely to win an event or game. The "chalk" refers to a favorite, usually a heavy favorite. Users who like to bet big favorites are referred to "chalk eaters" (often a derogatory term). An event or game in which the sports book has reduced its betting limits, usually because of weather or the uncertain status of injured players is referred to as a "circled game." "Laying the points or price" means betting the favorite by giving up points. The term "dog" or "underdog" refers to the team perceived to be most likely to lose an event or game. A "longshot" also refers to a team perceived to be unlikely to win an event or game. "Sides", "favorite", "chalk", "circled game", "laying the points price", "dog" and "underdog" can be integrated into the embodiments in a variety of manners.

The "money line" refers to the odds expressed in terms of money. With money odds, whenever there is a minus (−) the player "lays" or is "laying" that amount to win (for example $100); where there is a plus (+) the player wins that amount for every $100 wagered. A "straight bet" refers to an individual wager on a game or event that will be determined by a point spread or money line. The term "straight-up" means winning the game without any regard to the "point spread"; a "money-line" bet. "Money line", "straight bet", "straight-up" can be integrated into the embodiments in a variety of manners.

The "line" refers to the current odds or point spread on a particular event or game. The "point spread" refers to the margin of points in which the favored team must win an event by to "cover the spread." To "cover" means winning by more than the "point spread". A handicap of the "point spread" value is given to the favorite team so users can choose sides at equal odds. "Cover the spread" means that a favorite win an event with the handicap considered or the underdog wins with additional points. To "push" refers to when the event or game ends with no winner or loser for wagering purposes, a tie for wagering purposes. A "tie" is a wager in which no money is lost or won because the teams' scores were equal to the number of points in the given "point spread". The "opening line" means the earliest line posted for a particular sporting event or game. The term "pick" or "pick 'em" refers to a game when neither team is favored in an event or game. "Line", "cover the spread", "cover", "tie", "pick" and "pick-em" can be integrated into the embodiments in a variety of manners.

To "middle" means to win both sides of a game; wagering on the "underdog" at one point spread and the favorite at a different point spread and winning both sides. For example, if the player bets the underdog +4½ and the favorite −3½ and the favorite wins by 4, the player has middled the book and won both bets. "Middle" can be integrated into the embodiments in a variety of manners.

Digital gaming refers to any type of electronic environment that can be controlled or manipulated by a human user for entertainment purposes. A system that enables a human and a computer to interact according to set of both implicit and explicit rules, in an electronically powered domain for the purpose of recreation or instruction. "eSports" refers to a form of sports competition using video games, or a multiplayer video game played competitively for spectators, typically by professional gamers. Digital gaming and "eSports" can be integrated into the embodiments in a variety of manners.

The term event refers to a form of play, sport, contest, or game, especially one played according to rules and decided by skill, strength, or luck. In some embodiments, an event may be football, hockey, basketball, baseball, golf, tennis, soccer, cricket, rugby, MMA, boxing, swimming, skiing, snowboarding, horse racing, car racing, boat racing, cycling, wrestling, Olympic sport, etc. Event can be integrated into the embodiments in a variety of manners.

The "total" is the combined number of runs, points or goals scored by both teams during the game, including overtime. The "over" refers to a sports bet in which the player wagers that the combined point total of two teams will be more than a specified total. The "under" refers to bets that the total points scored by two teams will be less than a certain figure. "Total", "over", and "under" can be integrated into the embodiments in a variety of manners.

A "parlay" is a single bet that links together two or more wagers; to win the bet, the player must win all the wagers in the "parlay". If the player loses one wager, the player loses the entire bet. However, if he wins all the wagers in the "parlay", the player wins a higher payoff than if the player had placed the bets separately. A "round robin" is a series of parlays. A "teaser" is a type of parlay in which the point spread, or total of each individual play is adjusted. The price of moving the point spread (teasing) is lower payoff odds on winning wagers. "Parlay", "round robin", "teaser" can be integrated into the embodiments in a variety of manners.

A "prop bet" or "proposition bet" means a bet that focuses on the outcome of events within a given game. Props are often offered on marquee games of great interest. These include Sunday and Monday night pro football games, various high-profile college football games, major college bowl games and playoff and championship games. An example of a prop bet is "Which team will score the first touchdown?" "Prop bet" or "proposition bet" can be integrated into the embodiments in a variety of manners.

A "first-half bet" refers to a bet placed on the score in the first half of the event only and only considers the first half of the game or event. The process in which you go about placing this bet is the same process that you would use to place a full game bet, but as previously mentioned, only the first half is important to a first-half bet type of wager. A "half-time bet" refers to a bet placed on scoring in the second half of a game or event only. "First-half-bet" and "half-time-bet" can be integrated into the embodiments in a variety of manners.

A "futures bet" or "future" refers to the odds that are posted well in advance on the winner of major events, typical future bets are the Pro Football Championship, Collegiate Football Championship, the Pro Basketball Championship, the Collegiate Basketball Championship, and the Pro Baseball Championship. "Futures bet" or "future" can be integrated into the embodiments in a variety of manners.

The "listed pitchers" is specific to a baseball bet placed only if both of the pitchers scheduled to start a game actually start. If they don't, the bet is deemed "no action" and refunded. The "run line" in baseball, refers to a spread used instead of the money line. "Listed pitchers" and "no action" and "run line" can be integrated into the embodiments in a variety of manners.

The term "handle" refers to the total amount of bets taken. The term "hold" refers to the percentage the house wins. The term "juice" refers to the bookmaker's commission, most commonly the 11 to 10 users lay on straight point spread wagers: also known as "vigorish" or "vig". The "limit" refers to the maximum amount accepted by the house before the odds and/or point spread are changed. "Off the board" refers to a game in which no bets are being accepted. "Handle", "juice", vigorish", "vig" and "off the board" can be integrated into the embodiments in a variety of manners.

"Casinos" are a public room or building where gambling games are played. "Racino" is a building complex or grounds having a racetrack and gambling facilities for playing slot machines, blackjack, roulette, etc. "Casino" and "Racino" can be integrated into the embodiments in a variety of manners.

Customers are companies, organizations or individual that would deploy, for fees, and may be part of, of perform, various system elements or method steps in the embodiments.

Managed service user interface service is a service that can help customers (1) manage third parties, (2) develop the web, (3) do data analytics, (4) connect thru application program interfaces and (4) track and report on player behaviors. A managed service user interface can be integrated into the embodiments in a variety of manners.

Managed service risk management services are a service that assists customers with (1) very important person management, (2) business intelligence, and (3) reporting. These managed service risk management services can be integrated into the embodiments in a variety of manners.

Managed service compliance service is a service that helps customers manage (1) integrity monitoring, (2) play safety, (3) responsible gambling and (4) customer service assistance. These managed service compliance services can be integrated into the embodiments in a variety of manners.

Managed service pricing and trading service is a service that helps customers with (1) official data feeds, (2) data visualization and (3) land based, on property digital signage. These managed service pricing and trading services can be integrated into the embodiments in a variety of manners.

Managed service and technology platform are services that helps customers with (1) web hosting, (2) IT support and (3) player account platform support. These managed service and technology platform services can be integrated into the embodiments in a variety of manners.

Managed service and marketing support services are services that help customers (1) acquire and retain clients and users, (2) provide for bonusing options and (3) develop press release content generation. These managed service and marketing support services can be integrated into the embodiments in a variety of manners.

Payment processing services are those services that help customers that allow for (1) account auditing and (2) withdrawal processing to meet standards for speed and accuracy. Further, these services can provide for integration of global and local payment methods. These payment processing services can be integrated into the embodiments in a variety of manners.

Engaging promotions allow customers to treat your players to free bets, odds boosts, enhanced access and flexible cashback to boost lifetime value. Engaging promotions can be integrated into the embodiments in a variety of manners.

"Cash out" or "pay out" or "payout" allow customers to make available, on singles bets or accumulated bets with a partial cash out where each operator can control payouts by managing commission and availability at all times. The "cash out" or "pay out" or "payout" can be integrated into the embodiments in a variety of manners, including both monetary and non-monetary payouts, such as points, prizes, promotional or discount codes, and the like.

"Customized betting" allow customers to have tailored personalized betting experiences with sophisticated tracking and analysis of players' behavior. "Customized betting" can be integrated into the embodiments in a variety of manners.

Kiosks are devices that offer interactions with customers clients and users with a wide range of modular solutions for both retail and online sports gaming. Kiosks can be integrated into the embodiments in a variety of manners.

Business Applications are an integrated suite of tools for customers to manage the everyday activities that drive sales, profit, and growth, from creating and delivering actionable insights on performance to help customers to manage the sports gaming. Business Applications can be integrated into the embodiments in a variety of manners.

State based integration allows for a given sports gambling game to be modified by states in the United States or countries, based upon the state the player is in, based upon mobile phone or other geolocation identification means. State based integration can be integrated into the embodiments in a variety of manners.

Game Configurator allow for configuration of customer operators to have the opportunity to apply various chosen or newly created business rules on the game as well as to parametrize risk management. Game configurator can be integrated into the embodiments in a variety of manners.

"Fantasy sports connector" are software connectors between method steps or system elements in the embodiments that can integrate fantasy sports. Fantasy sports allow a competition in which participants select imaginary teams from among the players in a league and score points according to the actual performance of their players. For example, if a player in a fantasy sports is playing at a given real time sports, odds could be changed in the real time sports for that player.

Software as a service (or SaaS) is a method of software delivery and licensing in which software is accessed online via a subscription, rather than bought and installed on individual computers. Software as a service can be integrated into the embodiments in a variety of manners.

Synchronization of screens means synchronizing bets and results between devices, such as TV and mobile, PC and wearables. Synchronization of screens can be integrated into the embodiments in a variety of manners.

Automatic content recognition (ACR) is an identification technology to recognize content played on a media device or present in a media file. Devices containing ACR support enable users to quickly obtain additional information about the content they see without any user-based input or search efforts. To start the recognition, a short media clip (audio, video, or both) is selected. This clip could be selected from within a media file or recorded by a device. Through algorithms such as fingerprinting, information from the actual perceptual content is taken and compared to a database of reference fingerprints, each reference fingerprint corresponding to a known recorded work. A database may contain metadata about the work and associated information, including complementary media. If the fingerprint of the media clip is matched, the identification software returns the corresponding metadata to the client application. For example, during an in-play sports game a "fumble" could be recognized and at the time stamp of the event, metadata such as "fumble" could be displayed. Automatic content recognition (ACR) can be integrated into the embodiments in a variety of manners.

Joining social media means connecting an in-play sports game bet or result to a social media connection, such as a FACEBOOK® chat interaction. Joining social media can be integrated into the embodiments in a variety of manners.

Augmented reality means a technology that superimposes a computer-generated image on a user's view of the real world, thus providing a composite view. In an example of this invention, a real time view of the game can be seen and a "bet" which is a computer-generated data point is placed above the player that is bet on. Augmented reality can be integrated into the embodiments in a variety of manners.

Some embodiments of this disclosure, illustrating all its features, will now be discussed in detail. It can be understood that the embodiments are intended to be open ended in that an item or items used in the embodiments is not meant to be an exhaustive listing of such item or items, or meant to be limited to only the listed item or items.

It can be noted that as used herein and in the appended claims, the singular forms "a," "an," and "the" include plural references unless the context clearly dictates otherwise. Although any systems and methods similar or equivalent to those described herein can be used in the practice or testing of embodiments, only some exemplary systems and methods are now described.

FIG. 1 is a system for an incremental wager method. This system includes a live event 102, for example a sporting event such as a football game, basketball game, baseball game, hockey game, tennis match, golf tournament, eSports or digital game, etc. The live event 102 will include some number of actions or plays, upon which a user or customer can place a bet or wager, typically through an entity called a sportsbook. There are numerous types of wagers the user can make, including, a straight bet, a money line bet, a bet with a point spread or line that user's team would need to cover, if the result of the game was the same as the point spread the user would not cover the spread, but instead the tie is called a push. If the user is betting on the favorite, they are giving points to the opposing side, which is the underdog or longshot. Betting on all favorites is referred to as chalk, this is typically applied to round robin, or other styles of tournaments. There are other types of wagers, including parlays, teasers, and prop bets, that are added games, that often allow the user to customize their betting, by changing the odds and payouts they receive on a wager. Certain sportsbooks will allow the user to buy points, to move the point spread off of the opening line, this will increase the price of the bet, sometimes by increasing the juice, vig, or hold that the sportsbook takes. Another type of wager the user can make is an over/under, in which the user bets over or under a total for the live event, such as the score of American football or the run line in baseball, or a series of action in the live event 102. Sportsbooks have a number of bets they can handle, a limit of wagers they can take on either side of a bet before they will move the line or odds off of the opening line. Additionally, there are circumstance, such as an injury to an important player such as a listed pitcher, in which a sportsbook, casino or racino will take an available wager off the board. As the line moves there becomes an opportunity for a user to bet on both sides at different point spreads in order to middle and win both bets. Sportsbooks will often offer bets on portions of games, such as first half bets and half-time bets. Additionally, the sportsbook can offer futures bets on live events in the future. Sportsbooks need to offer payment processing services in order to cash out customers. This can be done at kiosks at the live event 102 or at another location.

Further, embodiments may include a plurality of sensors 104 that may be used such as motion sensors, temperature sensors, humidity sensors, cameras such as an RGB-D Camera which is a digital camera capturing color (RGB) and depth information for every pixel in an image, microphones, a radiofrequency receiver, a thermal imager, a radar device, a lidar device, an ultrasound device, a speaker, wearable devices etc. Also, the plurality of sensors 104 may include tracking devices, such as RFID tags, GPS chips or other such devices embedded on uniforms, in equipment, in the field of play, in the boundaries of the field of play, or other markers on the field of play. Imaging devices may also be used as tracking devices such as player tracking that captures statistical information through real-time X, Y positioning of players and X, Y, Z positioning of the ball.

Further, embodiments may include a cloud 106 or communication network which may be a wired and/or a wireless network. The communication network, if wireless, may be implemented using communication techniques such as Visible Light Communication (VLC), Worldwide Interoperability for Microwave Access (WiMAX), Long Term Evolution (LTE), Wireless Local Area Network (WLAN), Infrared (IR) communication, Public Switched Telephone Network (PSTN), Radio waves, and other communication techniques known in the art. The communication network may allow ubiquitous access to shared pools of configurable system resources and higher-level services that can be rapidly provisioned with minimal management effort, such as over the Internet and relies on sharing of resources to achieve coherence and economies of scale, like a public utility, while third-party clouds enable organizations to focus on their core businesses instead of expending resources on computer infrastructure and maintenance. The cloud 106 may be communicatively coupled to a wagering network 108 which may perform real time analysis on the type of play and the result of the play. The cloud 106 may also be synchronized with game situational data, such as the time of the game, the score, location on the field, weather conditions, and the like which may affect the choice of play utilized. For example, in other exemplary embodiments, the cloud may not receive data gathered from sensors and may, instead, receive data from an alternative data feed, such as SportsRadar®. This data may be provided substantially immediately following the completion of any play and the data from this feed may be compared with a variety of team data and league data based on a variety of elements, including down, possession, score, time, team, and so forth, as described in various exemplary embodiments herein.

Further, embodiments may include the wagering network 108 which may perform real time analysis on the type of play and the result of a play or action. The wagering network 108 (or cloud 106) may also be synchronized with game situational data, such as the time of the game, the score, location on the field, weather conditions, and the like which may affect the choice of play utilized. For example, in other exemplary embodiments, a wagering network 108 may not receive data gathered from sensors and may, instead, receive data from an alternative data feed, such as SportsRadar®. This data may be provided substantially immediately following the completion of any play and the data from this feed may be compared with a variety of team data and league data based on a variety of elements, including down, possession, score, time, team, and so forth, as described in various exemplary embodiments herein. The wagering network 108 can offer a number of software as a service managed services such as, user interface service, risk management service, compliance, pricing and trading service, IT support of the technology platform, business applications, game configuration, state based integration, fantasy sports connection, integration to allow the joining of social media, as well as marketing support services that can deliver engaging promotions to the user.

Further, embodiments may utilize a user database 110 which contains data relevant to all users of the system, which may include, a user ID, a device identifier, a paired device identifier, wagering history, and wallet information for each user.

Further, embodiments may include an odds calculation module 112 which utilizes historical play data to calculate odds for in-play wagers.

Further, embodiments may include a historical play database 114, that contains play data for the type of sport being played in the Live Sporting Event 102. For example, in American Football, for optimal odds calculation, the historical play data may include meta data about the historical plays, such as time, location, weather, previous plays, opponent, physiological data, etc.

Further, embodiments may utilize an odds database 116 that contains the odds calculated by the odds calculation module 112, and the multipliers for distance and path deviation, and is used for reference by a base wagering module 120 and to take bets from the user through a user interface and calculate the payouts to the user.

Further, embodiments may utilize a historical wager database 118 that contains wagers from the live event 102. Wagers may include a wager amount, odds, and an outcome such that a payout in the amount of the wager amount multiplied by the odds will be paid to a user if the outcome wagered on occurs, otherwise the wager amount being lost.

Further, embodiments may include the base wagering module 120 which allows a user to log in to a play by play wagering app 126. The base wagering module 120 further retrieves odds from the odds database 116 and displays wagers to a user, and receives a selected wager from the user. The base wagering module 120 further prompts a wager multiplier module 122 which determines a multiplier by which to increase the wager amount selected by the user. The base wagering module 120 displays a proposed wager increase to the user and receives a selection from the user to either keep the wager amount unchanged or increase the wager amount as proposed by the wager multiplier module 122, or alternatively increase the wager amount by an incremental amount less than or greater than the wager amount proposed by the wager multiplier module 122.

Further, embodiments may include a wager multiplier module 122 which is prompted by the base wagering module 120 when a wager is received from a user. The wager multiplier module 122 queries the historical wager database 118 and determines whether the user's recent wagers have been successful. The wager multiplier module 122 further determines an incremental amount by which to propose increasing the user's current wager and returns the proposed increase to the base wagering module 120.

Further, embodiments may include a mobile device 124 such as a computing device, laptop, smartphone, tablet, computer, smart speaker, or I/O devices. I/O devices may be present in the computing device. Input devices may include keyboards, mice, trackpads, trackballs, touchpads, touch mice, multi-touch touchpads and touch mice, microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers. Devices may include a combination of multiple input or output devices, including, e.g., Microsoft KINECT, Nintendo Wii mote for the WIT, Nintendo WII U GAMEPAD, or Apple IPHONE. Some devices allow gesture recognition inputs through combining some of the inputs and outputs. Some devices allow for facial recognition which may be utilized as an input for different purposes including authentication and other commands. Some devices allow for voice recognition and inputs, including, e.g., Microsoft KINECT, SIRI for IPHONE by Apple, Google Now or Google Voice Search. Additional user devices have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, may have larger surfaces, such as on a table-top or on a wall, and may also interact with other electronic devices. Some I/O devices, display devices or group of devices may be augmented reality devices. The I/O devices may be controlled by an I/O controller. The I/O controller may control one or more I/O devices, such as, e.g., a keyboard and a pointing device, e.g., a mouse or optical pen. Furthermore, an I/O device may also contain storage and/or an installation medium for the computing device. In still other embodiments, the computing device may include USB connections (not shown) to receive handheld USB storage devices. In further embodiments, an I/O device may be a bridge between the system bus and an external communication bus, e.g. a USB bus, a SCSI bus, a FireWire bus, an Ethernet bus, a Gigabit Ethernet bus, a Fiber Channel bus, or a Thunderbolt bus. In some embodiments the mobile device 124 could be an optional component and would be utilized in a situation in which a paired wearable device is utilizing the mobile device 124 as additional memory or computing power or connection to the internet.

Further, embodiments may include the wagering app 126, which is a program that enables the user to place bets on individual plays in the live event 102, and display audio and video from the live event 102, along with any available wagers on the mobile device 126. The wagering app 126 allows the user to interact with the wagering network 108 in order to place bets and provide payment/receive funds based on wager outcomes.

FIG. 2 illustrates the historical wager database 118. The historical wager database 118 stores data about wagers placed by users during the live event 102 including prior events. The data may info such as any of a user ID, wager amount, odds and outcome. The user ID identifying the user of the wagering network 108 who placed the wager, a wager amount is a monetary value wagered by the user, the odds are the multiple by which the wager amount will be increased to calculate a payout if the wager is won. A wager is won if the outcome, the result of a play, occurs, else the wager is lost. The historical wager database 118 is populated by the base wagering module 120 and is used by the wager increase module 122 to determine a wager increment amount as a multiple of a user's most recent wager if the user's recent wagers have been successful. Alternatively, the wager increase module increases the user's most recent wager as a fractional amount if the user's recent wagers have been unsuccessful. In an embodiment, a user Joe Smith's previous wager was $50 at odds of 2/1 that the next play during an American football team would result in a turnover. If the outcome is a punt resulting in a change of possession of the ball then user Joe Smith wins the wager. Since the previous wager was successful, the wager amount for the next wager is increased from $50 to $100.

FIG. 3 illustrates the base wagering module 120. The process begins with a user logging into the wagering network 108 at step 302 via a user interface by entering a username and a password. In an embodiment, the username is an email address, and the password is a combination of alphanumeric characters. The base wagering module 120 retrieves the current odds at step 304 for available wagers from an odds database 116. The base wagering module 120 prompts the wager increase module 122 at step 306 with retrieved odds for available wagers. The wager increase module 122 queries the historical wager database 118 for wagers previously placed by a user, ranking the wagers by how frequently they have been wagered upon by the user and selecting a wager that the user is likely to accept from the available wagers at the current odds based upon the user's wagering history. The wager increase module 122 further determines an amount by which to increase the user's most recent wager amount based on the user's recent successful or unsuccessful wagers and returns the selected wager and wager amount to the base wagering module 120. The base wagering module 120 displays, at step 308, the selected wager and wager amount determined by the wager increase module 122. The selected wager including a win condition and odds and the wager amount being a multiple of a previous wager placed by the user. In an embodiment, the wager includes a win condition, that the next play during an American football game will result in a first down, odds of 5/1 and a wager amount of $100, increased from the previous wager by an amount of $50 due to the user Joe Smith winning the previous wager. The base wagering module 120 receives, at step 310, whether the user accepted or rejected the wager. In an embodiment, the user accepting the wager by tapping a confirmation button of the wagering app 126 displayed on the mobile device 124. In an alternate embodiment, the user declines the wager by selecting an option declining the wager via the wagering app 126. Alternately, the user may choose to modify the wager such as by increasing or decreasing the wager amount. The user may alternatively decline the wager by failing to take any action and allowing the wager to timeout, such as with the passing of a specific amount of time or the close of betting for the play for which the wager was offered. If the user declined the wager, the base wagering module 120 returns to step 306 and prompts the wager increase module 122 for another wager. The base wagering module 120 compares, at step 312, the results of the play outcome to the outcome wagered upon by polling the plurality of sensors 104. The base wagering module 120 determines that the wager was won if the play outcome and the outcome wagered upon are the same. Alternatively, it determines that the wager was lost if the play outcome and the outcome wagered upon are different. In an embodiment, the wager win condition may be the next play during an American football game resulting in a first down and the actual result may be an incomplete pass resulting in a second down in which case the wager is lost. The base wagering module 120 saves wager data at step 314 to the historical wager database 118. The wager data may include wager amount, odds, win condition and the outcome. The wager data may further include the result of the wager, such as whether the wager was won or lost. The data may additionally include the payout or loss resulting from the wager. The base wagering module 120 adjusts, at step 316, the account balance of the user in the user database 110 based on the results of the wager. If the wager is won, then increase the account balance in an amount equal to the payout. The payout is determined based upon the odds accepted when the user placed the wager. In an embodiment, the odds are 5/1 and the wager amount is $50, so the payout would be $250. If the wager amount was not debited from the account balance prior to play completion, then adjust the account balance by the difference between the wager amount and the payout. Similarly, if the wager was lost and the wager amount was not previously debited form the account balance, reduce the account balance by the wager amount. The base wagering module 120 polls the sensors 104 at step 318 for whether the live event 102 is complete. If the live event is not complete, the base wagering module 120 returns to step 304 and repeats the steps. The base wagering module 120 ends the program at step 320 if the live event 102 is complete.

FIG. 4 illustrates the wager increase module 122. The process begins with the wager increase module 122 receiving a prompt at step 402 from the base wagering module 120 which may include available wagers and odds which may be placed on the next play during the live event 102. Additionally, the wager increase module 122 receives contextual information about the current state of the live event 102 from the sensors 104. In an embodiment the live event 102 is an American football game, and the contextual information may include info such as the current down, such as first, second third or fourth, and the number of yards to a first down, time left in the game, the score, the teams involved, the players on the field, the formation of the offense and defense, etc. the wager increase module 122 Queries at step 404 the historical wager database 118 for wagers previously placed by the user. The wagers may include a wager amount, odds, a win condition and the context of the live event 102 when the wagers, result of the wager, etc. In this example, user Joe Smith previously wagered $50 that the New England Patriots would convert a second and 5 for a first down with five minutes to go in the second quarter. The outcome of the wager was a run for 12 yards resulting in a first down, therefore the user Joe Smith won the wager, the wager increase module 122 compares, at step 406, the current context of the live event 102 to the context of the live event 102 when the user placed their most recent wager. In an exemplary embodiment, the user Joe Smith wagered $50 that the 2nd down and 5 yards to go for the New England Patriots with five minutes to go in the second quarter. The play resulted in a first down, making the new game context first and 10. The level of similarity between the plays can be based on a number of factors. In some embodiments the plays can have a similarity score that takes into account a number of context elements of the live event 102. The wager increase module 122 determines, at step 408, if the current context of the live event 102 is above a threshold of similarity to the context of the live event 102 for the user's most recent wager. In an exemplary embodiment the threshold of similarity is assigned by the wagering network 108 administrator and is defined as a similar down and within 3 yards to go for a first down. A similar down being defined as a kicking versus a non-kicking down. A 1st, 2nd, or 3rd down being a non-kicking down, and 4th down being a kicking down. The purpose of this distinction is to prevent the system from populating the wager amount on a 3rd down conversion play on a punting play when the 3rd down was not converted as this is a wager the user is unlikely to make. In this example, a 2nd down and 5 would be above the threshold of similarity to 1st down and 10. If the user's previous wager was placed on a play inside of the live event 102 that was above the similarity threshold, the wager increase module 122 selects, at step 410, the wager amount from the user's previous wager. In an exemplary embodiment, the context of the user Joe Smith's most recent wager, $50 on the conversion of a 2nd down and 5, is above the similarity threshold, of also being on a non-kicking down, to the current context of the live event 102, a 1st and 10 play. The wager amount, $50, is selected at step 410. If the user's previous wager was on a play not above the similarity threshold, most recent wager placed by the user that is above the similarity threshold is selected at step 412 from the user's previous wagers in the historical wager database 118. In another embodiment in which the position on field is part of the similarity threshold, the user Joe Smith's most recent wager on 2nd and 4 from the 40 yard line, may not be above the similarity threshold because the next play is from the 1 yard line. In that example, the user Joe Smith's most recent wager on a 1st and goal from the 1 yard line may be selected at step 412. The wager amount selected at either step 410 or 412 is used at step 414 as the basis for the proposed wager amount. The wager increase module 122 determines at step 416 if the user's most recent wager was successful. The success or failure of the user's most recent wager is used to determine if the amount of the wager selected at step 414 should be increased by an increment, i.e. double or triple the amount, or by a fraction, i.e. by 10% or 50%. If the user's won their most recent wager the wager increase module 122 determines at step 418 the incremental wager increase to propose to the user for their next available wager. In an embodiment that increment is always to double the wager amount of the wager the user just won. This would result in a wager amount of $100 being proposed to the user Joe Smith's on his next wagering opportunity. The $100 being his most recent wager of $50 being doubled. In other embodiments the increase in the wager can vary contextually. For example, the user's wager history may be examined to determine the maximum amount the user has wagered on a similar play and propose that amount. Alternatively, the user's average or most frequent wager amount on similar plays could be used as the base and/or increment for increasing the wager amount proposed to the user on their next wagering opportunity. Additionally, the user may have the option to "let it ride" and wager their winnings on the previous play or combination of plays on their next wagering opportunity. If the user lost their most recent wager the wager increase module 122 determines at step 420 the fractional wager increase to propose to the user for their next available wager. In an embodiment that increment is always 50% more than the wager amount of the wager the user just lost. This would result in a wager amount of $75 being proposed to the user Joe Smith's on his next wagering opportunity. The $75 being his most recent wager of $50 plus 50%. In other embodiments the increase in the wager can vary contextually. For example, the user's wager history may be examined to determine that they have lost multiple consecutive wagers and adjust the wager increase by more. Alternatively, the frequency and context in which the user selects a proposed wager can be used to determine the wager amount proposed. In an exemplary embodiment, a user may elect to wager less when larger increases in their wager amount are proposed and the system would decrease the amount their next proposed wager amount. The wager increase module 122 returns, at step 420, a wager proposal to the base wagering module 120.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A method of determining a wager adjustment during a live sporting event, the method comprising:
   storing, in a database, past wagers;
   providing, during a live sporting event, a default wager option to a wagering network for a wager on an upcoming action in the live sporting event, wherein the wagering network receives sensor data from at least one sensor at the live sporting event in substantially real time during the live sporting event and stores the sensor data in the database;
   comparing, during the live sporting event, by an incremental wagering module before the upcoming action in the live sporting event, information about one or more past wagers to context of the upcoming action in the live sporting event;

determining, during the live sporting event, a similarity score based on a comparison of the upcoming action and a past action in the live sporting event for which sensor data was stored in the database;

comparing, in real time during the live sporting event, the determined similarity score to a similarity threshold assigned on the wagering network;

determining, in real time during the live sporting event, when a context of the upcoming action exceeds the similarity threshold, by the incremental wagering module before the upcoming action in the live sporting event, a wager adjustment;

determining, in real time during the live sporting event, when the context of the upcoming action does not exceed the similarity threshold, a selection of a most recent wager placed by the user that is above the similarity threshold; and providing, by the incremental wagering module on a gaming device and before the upcoming action in the live sporting event, a proposed wager corresponding to the wager adjustment for the wager on the upcoming action during the live sporting event, wherein the proposed wager is displayed by the gaming device via a wagering application, wherein the information about the one or more past wagers comprises wager amount, wager odds, and wager success.

2. The method of claim 1, wherein the proposed wager is equal to a maximum wager placed in the one or more past wagers.

3. The method of claim 1, wherein the proposed wager is equal to an average wager placed in the one or more past wagers.

4. The method of claim 1, wherein the proposed wager is equal to an amount won by a successful wager on one or more of a previous action or a combination of actions before the upcoming action.

5. A system for determining a wager adjustment during a live sporting event, the system comprising:

A historical database configured to store past wagers and data received from a past action in a live sporting event;

one or more sensors at the live sporting event configured to transmit sensor data substantially in real time during the live sporting event, wherein sensor data is stored in the historical database;

an odds database that is configured to generate odds for wagers in real during the live sporting event on an upcoming action during the live sporting event based on the received sensor data;

an incremental wager module configured to:

determine, during the live sporting event before the upcoming action in the live sporting event, a wager adjustment based on a comparison of one or more past wagers to a context of an upcoming action in the live sporting event, determine a similarity score based on a comparison of the upcoming action and a past action in the live sporting event for which sensor data was stored in the historical database;

compare, in real time, the determined similarity score to a similarity threshold assigned on the wagering network;

provide, during the live sporting event, when the context of the upcoming action exceeds the similarity threshold, a proposed wager on the upcoming action of the live sporting event; and provide, during the live sporting event, when the context of the upcoming action does not exceed the similarity threshold, a selection of a most recent wager placed by the user that is above the similarity threshold, wherein the incremental wager module determines the wager adjustment in substantially real time, and a gaming device that is configured to display the proposed wager via a wagering application.

6. The system of claim 5, wherein the wager adjustment is equal to an amount won by a successful wager on one or more of the previous actions or a combination of action before the next upcoming action.

7. The method of claim 1, wherein the sensor data is camera data.

8. The system of claim 5, wherein the one or more sensors comprise one or more cameras.

* * * * *